United States Patent Office 2,743,903
Patented May 1, 1956

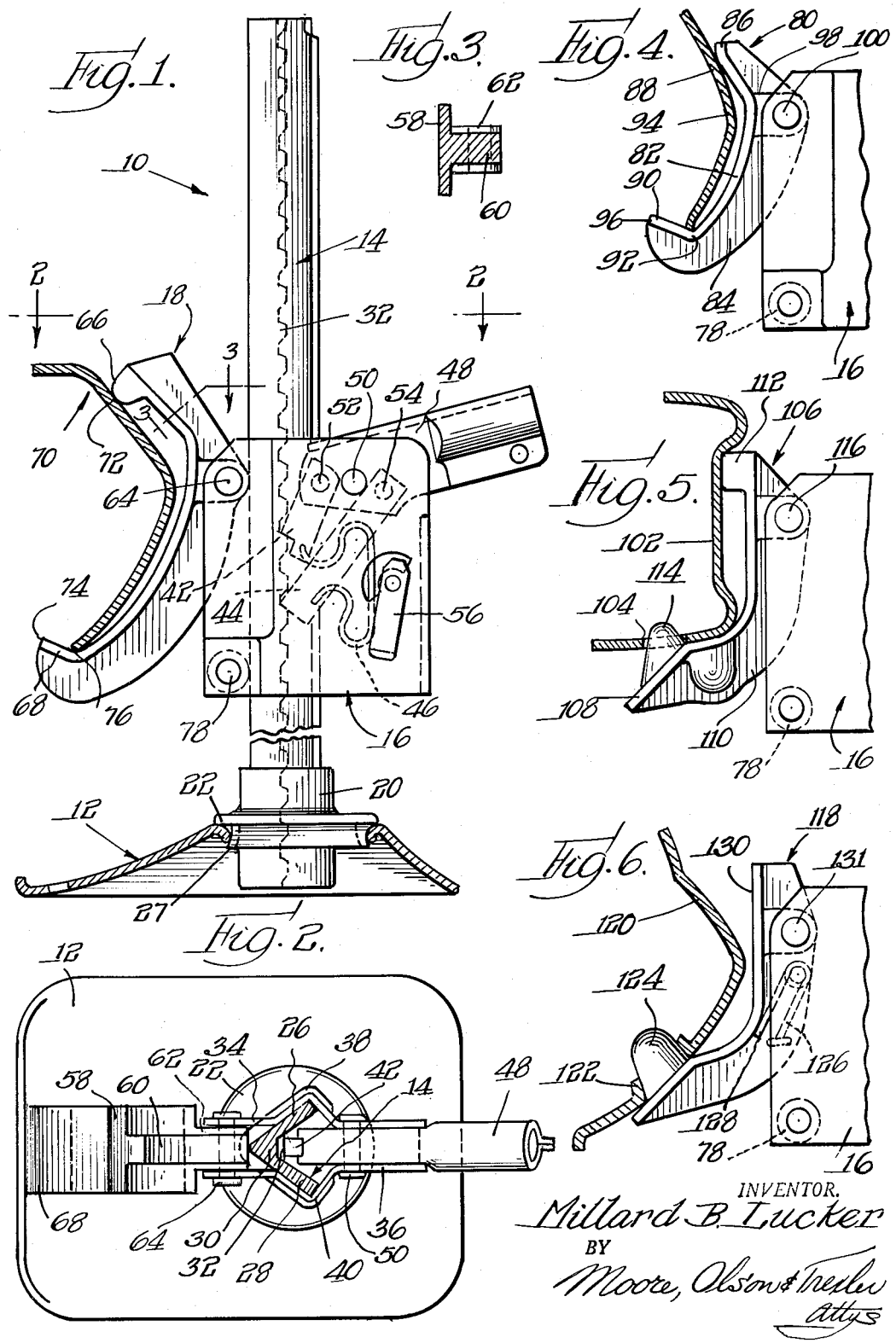

2,743,903

AUTOMOBILE JACK

Millard B. Lucker, St. Joseph, Mich., assignor to Auto Specialties Manufacturing Company, St. Joseph, Mich., a corporation of Michigan Application August 16, 1950, Serial No. 179,825

8 Claims. (Cl. 254—133)

This invention relates to lifting jacks and more particularly to bumper jacks used with automobiles and trucks.

The lifting jack of the present invention is particularly adapted for use with vehicles of the type adapted to lift an automobile or truck by engagement with the bumper. In jacks of this type, a load rest connected to a lifting member engages the bumper of the vehicle and thereby provides mechanical interconnection between the automobile and the load lifting member of the jack. Many bumpers on vehicles today are being manufactured with intricately and non-symmetrical contours and cross sections. It has been found that the load rests used heretofore are not effective to hold and support these bumpers of unusual design at all stages during the lifting movements of the jack.

More specifically, the load rest engages the bumper when the load lifting member is in a lowered position. It is desirable that two-point contact be made between the load rest and the bumper whereby to give more rigid support of the bumper. As the load lifting member is raised whereby to raise the bumper, the bumper is in effect rotated about a point adjacent the opposite set of wheels. As a consequence, if the load rest is formed integral with a movable object with respect to the load lifting member of the jack, the bumper will be rotated out of contact therewith at one point whereby to result in one-point contact between the bumper and the load rest. One-point contact is less satisfactory and does not hold the bumper in a firm gripping manner.

Accordingly it is an important object of the present invention to provide an improved load rest for use with lifting jacks; more specifically, it is an object of the invention to provide an improved load rest for use with bumper jacks.

Another object of the invention is to provide a load rest for bumper jacks which positively and firmly grips and supports bumpers of unusual and peculiar designs during all portions of the lifting and lowering movements of the jack; more particularly, it is an object to provide two-point contact between the bumper and the load rest in all positions of the load rest on the jack.

Yet another object of the invention is to provide an improved mounting for load rests of the type set forth; more specifically, it is an object to provide a pivotal mounting for load rests to be used with bumpers of unusual design whereby to give positive gripping engagement between the load rests and the bumper at all times during the lifting and lowering of the bumper.

These and other objects and advantages of the invention will be better understood from the following description when taken in conjunction with the drawings. In the drawings wherein like reference numerals have been used to designate like parts throughout:

Figure 1 is a side view partly in vertical section showing a bumper jack provided with a load rest shaped and mounted according to the principles of the present invention, the load rest being shown in operative contact with a bumper;

Figure 2 is a plan view of the jack shown in Figure 1;

Figure 3 is a cross sectional view of the load carrying member as seen in the direction of the arrow along the line 3—3 of Figure 1;

Figure 4 is a partial view showing a modified form of load rest embodying the principles of the present invention;

Figure 5 is a view similar to Figure 3 and showing a modified form of load rest; and Figure 6 is a view also similar to Figure 3 and showing a further modified form of load rest.

Referring to the drawings and particularly to Figures 1 and 2 thereof, there is shown a jack, generally designated by the numeral 10, made in accordance with and embodying the principles of the present invention. Jack 10 comprises a base 12 which supports a ratchet bar or jack strut 14, a load lifting housing 16, and a load support 18 mounted on housing 16.

Base 12 is preferably formed of sheet metal by any suitable method of fabrication such as stamping and is substantially recangular in shape providing a broad base of support for the jack. A supporting member 20 is mounted in and retained by base 12 by means of flanges 22 and 27 formed on member 20. Referring to Figure 2, it will be seen that ratchet bar or jack strut 14 is substantially V-shaped in cross section and includes a pair of converging sides 26 and 28 which are joined as at 30. Disposed between sides 26 and 28 are a plurality of teeth 32 which coact with a load lifting mechanism to be described. The supporting member 20 has an aperture formed therein shaped complementary to the outline of bar 14 which receives and holds the lower end of bar 14.

The load lifting housing 16 is preferably formed from a pair of sheet metal plates 34 and 36 which are deformed outwardly as at 38 and 40 to conform to the shape of bar 14. Mounted within housing 16 is a load lifting mechanism including a pair of pawls 42 and 44 which are interconnected by a spring 46. Also mounted on housing 16 is an actuating arm 48 which is pivoted on housing 16 about an axle 50. One end of pawls 42 and 44 is pivotally connected to arm 48 as at 52 and 54 and the other end of pawls 42 and 44 contact the teeth 32 of bar 14. When the mechanism is in the condition shown in Figure 1, the housing 16 is moved downwardly along bar 14 when arm 48 is moved upwardly and downwardly. When it is desired to raise the housing 16, spring 46 is urged to the left, as viewed in Figure 1, by means of an arm 56 which reverses the operation of pawls 42 and 44.

As may be best seen in Figure 1, the load rest on support 18 is substantially C-shaped or J-shaped and generally conforms to the contours of all bumpers which are C-shaped or J-shaped in cross section. Referring to Figure 3 is will be seen that the cross section of the load support 18 is substantially T-shaped and comprises a forward transversely extending wall 58 and a reinforcing rib 60. Wall 58 extends the entire length of load support 18 as does the rib 60. Rib 60 is widened or thickened as at 62 to provide a reinforced portion for attaching support 18 to the housing 16. A bolt 64 extends through suitable apertures in housing 16 and support 18 to provide a pivotal connection therebetween. The point of pivot 64 between housing 16 and load support 18 is disposed off-center toward the upper edge of load support 18. Load rest 18 pivots in a single plane which is preferably disposed vertically and substantially parallel to the longitudinal axis of bar 14. There is substantially no horizontal movement of load support 18 and substantially no rotation in a plane parallel to the axis of bolt 64.

A substantially semi-circular abutment member 66 is formed on the upper inner side of wall 58 and an upturned retaining means 68 is formed on the lower end of load support 18. As is best seen in Figure 1, a bumper indicated generally by the numeral 70, is engaged by load support 18 along the surface of abutment member 66 and at the point of junction between wall 58 and retaining member 68. The engaging surface of abutment member 66 is rounded whereby to give little or no tendency to mar the finish on the contacting surface of bumper 70. Retaining member 68 is so positioned with respect to wall 58 that the distance between the point of contact 72 between bumper 70 and upper abutment member 66 and the outer lower edge 74 of member 68 is shorter than the distance between point 72 and the point of juncture 76 between wall 58 and retaining member 68. It will be seen that with retaining member 68 shaped in this manner, the lower edge of bumper 70 will be firmly held in position and the upturned end of retaining member 68 will positively prevent inadvertent shifting of bumper 70 with respect to load support 18. The points 72 and 76 afford two-point contact between the support 18 and bumper 70.

In operating the jack of Figures 1 through 3, the bumper 70 is normally engaged when the housing 16 is in a lowered position. It will be noted that two-point contact is provided in this position between the load rest 18 and bumper 70. As the housing 16 is moved upwardly by actuating arm 48 it will carry with it the load support 18. Load support 18 will in turn cause bumper 70 to be raised and bumper 70 will in effect rotate about a point disposed adjacent the opposite set of wheels of the vehicle. The upper edge of bumper 70 will move away from jack 10 while the lower edge of the bumper disposed at point 76 will tend to move toward jack 10. In order to maintain two-point contact between load support 18 and bumper 70, it therefore will be necessary to rotate support 18 in a counterclockwise direction as viewed in Figure 1. Such movement of load support 18 will be facilitated by reason of the pivotal connection about bolt 64. Accordingly, as bumper 70 is lifted, load support 18 will in effect rotate counterclockwise whereby to maintain two-point contact with bumper 70. There will be no tendency for bumper 70 to disengage load support 18 since load support 18 always moves so that a firm gripping connection is made with the bumper in all positions of housing 16.

Positioned on housing 16 below the pivot point 64 is a roller 78 which contacts the apex of the ratchet bar 14. Roller 78 facilitates easy movement of housing 16 along the bar 14 even when a load is positioned on the load support 18. It should be noted that, as is clearly shown in Fig. 2, the roller 78 is disposed on the same side of the ratchet bar as the pivot pin 64 and preferably substantially vertically beneath the pivot point. Thus, a load on the load support member 18 is transmitted to the housing 16 in a manner that tends to rotate the housing about the pawls in a counterclockwise direction, as viewed in Fig. 1, so that a substantial portion of the load is applied directly to the ratchet bar by the roller. In addition, this action causes the rear portions of the housing to be pulled against the relatively narrow rearwardly facing edges of the sides 26 and 28 of the ratchet bar and tends to pull the sides of the housing forwardly and away from the relatively broad side faces of the ratchet bar. Furthermore, by referring to Fig. 2, it will be seen that the rearwardly facing narrow edges of the ratchet bar are angularly disposed relative to each other so that the engaging rear walls of the housing tend to center the housing on the bar to prevent binding of the broad sides of the housing on the broad side faces of the ratchet bar. It is thus seen that the novel structure of this invention is such that transverse forces are transmitted from the housing to the ratchet bar without substantial frictional resistance, since such forces are transmitted by the roller to the frontal narrow edge of the bar and by the housing to the rearwardly facing angularly disposed narrow bearing edges of the bar.

Referring to Figure 4 there is shown a modified form of load support, generally designated by the numeral 80. Support 80 is substantially C-shaped and includes a front wall 82 and a reinforcing rib 84 disposed substantially perpendicularly thereto. The upper end of wall 82 is curved rearwardly as at 86 to provide a contact and support point 88. A retaining member 90 is formed on the lower end of load support 80 and is formed integral with wall 82. The juncture 92 between wall 82 and retaining member 90 forms a support for the lower edge of the bumper 94. The distance between point 88 and the outer edge 96 of retaining member 90 is less than the distance between points 88 and 92, whereby retaining member 90 serves to hold the bumper 94 in operative contact with load support 80 at all times.

The reinforcing rib 84 is provided with a widened portion 98 through which passes a bolt 100. Bolt 100 is also attached to the housing 16 and allows pivotal motion between load support 80 and housing 16. It will be seen that two-point contact is maintained between support 80 and bumper 94 at points 88 and 92 in all positions of housing 16, since the support 80 can pivot about bolt 100.

The operation of load support 80 is substantially the same as load support member 18. As the bumper 94 is lifted and rotated the load support 80 pivots about bolt 100 and therefore firmly grips bumper 94 in all positions thereof.

There is shown in Figure 5 another form of load support member which is particularly adapted for use with bumpers, such as bumper 102 having an aperture 104 formed in the lower surface thereof. This modified form of load support member, generally designated by the numeral 106, is substantially C-shaped or J-shaped and has a forward wall 108 reinforced by a rib 110. A projection 112 on the upper end of wall 108 forms an abutment means for contact with the upper edge of bumper 102. An outwardly extending projection 114 is adapted to extend through aperture 104 and thereby firmly grip bumper 102. Pivotal connection is made between load support 106 and housing 16 by means of a pin 116. It will be seen that the load support 106 will firmly grasp bumper 102 in all positions during the lowering and raising of housing 16 by pivoting about point 116. Two-point contact will be maintained between the bumper 102 and support 106 by projections 112 and 114 as support 106 pivots about pin 116 during lowering and lifting of housing 16.

Yet another form of the invention is shown in Figure 6. This form of load support generally designated by the numeral 118, is adapted for use with bumpers, such as bumper 120 having an aperture in the lower surface thereof surrounded by an inwardly directed flange 122. With this form of bumper the initial contact between the load support 118 and the bumper is by means of a projection 124 extending through the aperture in bumper 120 as shown in Fig. 6. As the load is applied, the load rest 118 pivots in a counterclockwise direction until the wall 130 bears against the rearmost extending portion of the bumper to securely support the bumper. There is also provided a spring 126, one end of which is connected to housing 16 and the other end 128 of which bears against the outer wall 130 of load support 118. Spring 128 normally urges the lower end of load support 118 outwardly, pivoting support 118 about pin 131 which connects load support 118 to housing 16. It will be seen that the spring 128 in effect urges load support 118 into operative engagement with bumper 120. Due to the pivotal connection between load support 118 and housing 16 the projection 124 will always be in a position relative to bumper 120 which provides optimum supporting contact between bumper 120 and support 118.

It will be seen that all forms of the invention give maximum supporting and retaining action between the load support and the bumper in all positions as the load lifting housing 16 is moved upwardly and downwardly along ratchet bar 14. More specifically, two-point contact is provided between the load support and the bumper at all times. This improved action is provided primarily by the pivotal connection between the load support and the load lifting housing. In the forms of the invention shown in Figures 1 through 4, additional holding action is obtained due to the upturned structure of retaining members 68 and 90. Additional holding action is provided in the load support shown in Figures 5 and 6 by reason of the upwardly directed projections 114 and 124 respectively which extend through an aperture formed in the bumpers.

Although certain preferred forms of the present invention have been shown for purposes of illustration, it is to be understood that various changes and modifications can be made therein without departing from the spirit and scope of the invention. Accordingly the invention is to be limited only as set forth in the following claims.

The invention is hereby claimed as follows:

1. In a lifting jack including a jack strut and a load lifting housing mounted on the strut for movement therealong, a load rest including a transversely extending wall and a reinforcing rib disposed substantially perpendicular to said wall, an aperture formed in said reinforcing rib substantially below an upper end of said wall and above the vertical center point of said wall, pin means passing through said aperture and connected to the load lifting housing for pivotally mounting the load rest on the housing, and an abutment formed on said wall adjacent the upper end thereof and above said pin means for engaging a bumper, the lower end of said wall having an upwardly and outwardly extending bumper retaining and supporting portion, said abutment and bumper retaining portion contacting an associated bumper at only two spaced apart points and holding the remaining portions of the bumper face out of contact with said load rest.

2. In a lifting jack including a jack strut and a load lifting housing mounted on the strut for movement therealong, said housing having spaced apart wall portions extending forwardly of said strut, a load rest including a transversely extending wall and a reinforcing rib disposed substantially centrally of and perpendicular to said wall, said rib being disposed between said housing wall portions, an aperture formed in said reinforcing rib, and a bolt passing through said aperture and connected to said wall portions of the load lifting housing for pivotally mounting the load rest on the housing, said transverse wall of the load rest overlying forwardly facing edges of said housing wall portions to cover the space between said housing wall portions, a rounded abutment member formed on said wall adjacent the upper end thereof for engaging a bumper, the lower end of said wall being turned upwardly and outwardly to provide a bumper engaging and supporting portion, the outer edge of said bumper supporting portion being disposed nearer said abutment member than the adjacent section of said wall whereby to insure that the associated bumper is held by said retaining member to provide two-point contact between said load rest and an associated bumper, said rounded abutment member and bumper engaging portion contacting an associated bumper at only two spaced apart points and holding the remaining portions of the bumper face out of contact with said load rest.

3. In a bumper jack including a ratchet bar and a load lifting housing mounted on said bar for movement therealong, a load rest having a substantially C-shaped transverse wall and a centrally disposed perpendicularly extending reinforcing rib pivotally mounted on the housing, an outwardly extending and rounded bumper abutment member formed on the upper edge of said transverse wall, and a bumper retaining and supporting member formed on the lower edge of said transverse wall and adapted to engage the lower edge of a bumper, said abutment member and supporting member providing two-point contact between said load rest and an associated bumper in all positions of the load lifting mechanism along the ratchet bar.

4. In a bumper jack including a ratchet bar and a load lifting housing mounted on said bar for movement therealong, a load rest pivotally mounted on the housing, an upwardly and outwardly extending projection formed on said load rest adjacent the lower edge thereof and adapted to extend through an aperture in the lower side of an associated bumper, and a spring mounted on the load lifting housing and pressing against said load rest at a point below the pivotal connection between said load rest and the load lifting housing, said spring continually urging the lower edge of the load rest outwardly away from the load lifting housing.

5. In a lifting jack including a jack strut and a load lifting housing mounted on the strut for movement therealong, a generally C-shaped load rest including a transversely extending wall and a reinforcing rib disposed substantially centrally of and perpendicular to said wall, an aperture formed in said reinforcing rib at a point spaced below the upper end of said rib and above the vertical center point of said rib, pin means passing through said aperture for pivotally connecting the load rest to the load lifting housing, an upwardly and outwardly extending rounded projection formed on said load rest adjacent the lower edge thereof and adapted to engage an associated bumper, and an outwardly extending projection formed on the upper end of said transverse wall and positioned to abut against the upper portion of an associated bumper, the second mentioned projection at the upper end and the rounded projection on the lower end of said load rest contacting an associated bumper at only two spaced apart points and holding the remaining portions of the bumper face out of contact with said load rest.

6. A jack comprising a jack strut, a load lifting mechanism including a housing mounted on said strut, an actuating arm mounted on said housing for actuating said mechanism to cause relative movement between said housing and said strut, a substantially C-shaped load rest, means pivoting said load rest to said housing at a point disposed toward the upper end of said load rest and forwardly of said strut, an upwardly and outwardly extending projection formed on said load rest adjacent the lower edge thereof and adapted to engage an associated bumper, an outwardly extending projection formed on the upper end of said load rest and positioned to abut against the upper portion of an associated bumper, said last-mentioned projection being disposed above the point of pivot between said load rest and said housing, said upwardly extending projection and said projection contacting an associated bumper at only two spaced apart points and holding the remaining portions of the bumper face out of contact with said load rest, and a roller mounted on said housing substantially in vertical alignment with said pivot point and contacting said strut at a point below the pivotal connection between the load rest and the housing.

7. A lifting jack comprising a jack strut having rearwardly facing longitudinally extending relatively narrow bearing edges, a load lifting mechanism including a housing mounted on said strut, actuating means connected with said housing for shifting said housing along said strut, a load rest including a transversely extending wall and a reinforcing rib disposed substantially centrally of and perpendicular to said transverse wall, said housing having spaced apart wall portions extending forwardly of said strut and on opposite sides of said reinforcing rib, said rib having an aperture formed therein substantially below an upper end of said transverse wall and above the vertical center point of the transverse wall, a pin passing through said aperture and connected to said housing wall portions forwardly of said strut, an abutment surface formed on said transverse wall adjacent the upper end thereof and above the aperture in said rib for engaging the bumper, the lower end of said transverse wall being turned upwardly and outwardly to provide a bumper engaging and supporting portion, said abutment surface and bumper retaining portion contacting an associated bumper at only two spaced apart points and holding the remaining portions of the bumper face out of contact with said load rest, and a roller mounted on said housing substantially vertically below said pin and contacting a forwardly facing surface of said strut, said housing having portions disposed for engagement with said rearwardly facing relatively narrow bearing edges of said strut.

8. An auto bumper jack comprising an elongated rigid strut having a generally channel-shaped cross section and opposed spaced side walls providing spaced, exposed free edges bounding an elongated channel opening, means for supporting the strut in a generally upstanding position, support means shiftable longitudinally of said rigid strut and including housing means shiftably receiving said strut and engaging said free edge portions of said strut in any longitudinally shifted position of said support means therealong, actuating means having at least a portion thereof disposed within said channel-shaped strut and operable adjustably to move said housing means longitudinally of said strut, said housing means including a pair of spaced generally parallel sides projecting outwardly from a closed side of the strut, a load rest including a generally vertically elongated, frontally concaved, bumper receiving portion traversing free generally vertical edges of said housing means sides, a vertically disposed wall section joined to and extending from said bumper receiving portion between said housing means sides, pin means pivotally connecting said load rest wall to upper corner portions of said housing means sides with the elongated central plane of the load rest disposed generally parallel with and generally registering with the longitudinal central plane of said strut, and with the concavity of the load rest disposed normally substantially vertically thereon and with the concavity of the load rest facing away from said strut, said bumper receiving portion of said load rest extending substantially above said pin means and said housing means sides and having an abutment formed thereon adjacent an upper end thereof and extending forwardly for engaging a bumper, and said bumper receiving portion having an upwardly and outwardly projecting bumper engaging and retaining means formed adjacent the lower end thereof, said pin means being disposed well above the vertical center of said bumper receiving portion.

References Cited in the file of this patent

UNITED STATES PATENTS

| | | |
|---|---|---|
| 1,508,044 | Bate | Sept. 9, 1924 |
| 1,526,152 | Kinney | Feb. 10, 1925 |
| 2,259,789 | Akins | Oct. 21, 1941 |
| 2,505,187 | Juergens | Apr. 25, 1950 |
| 2,554,910 | Jensen | May 29, 1951 |
| 2,556,006 | Slack | June 5, 1951 |
| 2,590,970 | Jensen | Apr. 1, 1952 |
| 2,630,297 | Huntz | Mar. 3, 1953 |